United States Patent
Kim et al.

(10) Patent No.: US 7,166,346 B2
(45) Date of Patent: Jan. 23, 2007

(54) RECORDING MEDIUM HAVING SUPER-RESOLUTION NEAR-FIELD STRUCTURE AND METHOD AND APPARATUS FOR REPRODUCING THE SAME

(75) Inventors: Joo-ho Kim, Yongin-si (KR); Junil Tominaga, Ibaraki-ken (KR); Du-seop Yoon, Seongnam-si (KR)

(73) Assignees: Samsung Electronics Co., Ltd., Suwon-si (KR); National Institute of Advanced Industrial Science and Technology, Tokyo (JP)

( * ) Notice: Subject to any disclaimer, the term of this patent is extended or adjusted under 35 U.S.C. 154(b) by 108 days.

(21) Appl. No.: 10/813,619

(22) Filed: Mar. 31, 2004

(65) Prior Publication Data
US 2005/0009260 A1   Jan. 13, 2005

(30) Foreign Application Priority Data
Apr. 1, 2003   (JP)   ............................. 2003-098501

(51) Int. Cl.
*B32B 3/02* (2006.01)
(52) U.S. Cl. .................... 428/64.4; 369/13.4; 428/64.5
(58) Field of Classification Search .................... None
See application file for complete search history.

(56) References Cited

U.S. PATENT DOCUMENTS 6,920,640 B1 *   7/2005   Hsu et al. .................... 720/719

* cited by examiner

*Primary Examiner*—Bruce H. Hess
(74) *Attorney, Agent, or Firm*—Stein, McEwen & Bui, LLP

(57) ABSTRACT

A read-only recording medium for achieving a carrier-to-noise ratio (CNR) using a super-resolution near-field structure (Super-RENS) on which information has been prerecorded includes a substrate having the information recorded on its surface, a reflective layer formed from a phase change material on the substrate, a first dielectric layer formed on the reflective layer, and a mask layer formed from metal oxide or nanoparticles on the first dielectric layer.

19 Claims, 13 Drawing Sheets

FREQUENCY DOMAIN

TIME DOMAIN

Pit Length 400 nm (r=51.2)

FREQUENCY DOMAIN

TIME DOMAIN

FREQUENCY DOMAIN

TIME DOMAIN

FREQUENCY DOMAIN

TIME DOMAIN

FREQUENCY DOMAIN

TIME DOMAIN

FREQUENCY DOMAIN

TIME DOMAIN

US 7,166,346 B2

RECORDING MEDIUM HAVING SUPER-RESOLUTION NEAR-FIELD STRUCTURE AND METHOD AND APPARATUS FOR REPRODUCING THE SAME

CROSS-REFERENCE TO RELATED APPLICATIONS

This application claims the benefit of Japanese Patent Application No. 2003-98501, filed on Apr. 1, 2003, in the Japanese Intellectual Property Office, the disclosure of which is incorporated herein by reference.

BACKGROUND OF THE INVENTION

1. Field of the Invention

The present invention relates to a read-only recording medium on which information has been recorded, and more particularly, to a read-only recording medium with a super-resolution near-field structure (Super-RENS) on which optically readable information has been prerecorded, a method for reading the information, and an apparatus for reproducing the same.

2. Description of the Related Art

Optical discs including digital versatile discs (DVDs) continue to gain popularity as high-density recording media designed to record image data or computer data. In particular, a read-only optical disc such as DVD-ROM on which a movie or computer program has been prerecorded is commonly used to effortlessly distribute massive amounts of information.

Information has been prerecorded on a substrate of a read-only optical disc in the form of marks (pits). In order to read out the information, an optical disc reproducing apparatus emits a laser beam onto the optical disc, and a photodetector detects the intensity of a reflected beam that varies depending on presence or absence of rows of marks. For example, the intensity of the reflected beam is reduced if the marks are present while the intensity is increased if the marks are absent.

Thus, the amount of information that can be recorded on the read-only optical disc is determined by the size of marks (pits) readable in the reproducing apparatus. Reducing the size of marks (pits) increases the density of information that can be recorded on the optical disc by recording more information per disc.

The size of marks readable by the reproducing apparatus is determined by, among other factors, resolution limit (RL) of an optical system of the reproducing apparatus. The RL of the optical system can be theoretically calculated by Equation (1):

$$RL = \lambda/(4 \times NA) \quad (1)$$

where $\lambda$ is the wavelength of a laser beam and NA is the Numerical Aperture of an objective lens.

In the case of a red laser commonly used, RL of 265 nm is obtained by putting $\lambda=635$ nm and NA=0.6 into Equation (1). When a blue laser is used, RL of 156 nm is obtained by putting $\lambda=405$ nm and NA=0.65 into Equation (1). That is, an optical disc reproducing apparatus using the red laser does not allow a mark (pit) having a length not exceeding 265 nm to be read. Even in an optical disc reproducing apparatus using a short-wavelength blue laser, it is difficult to read a mark (pit) having a length not exceeding 156 nm.

FIG. 1 is a graph illustrating the relationship between a mark length and a carrier-to-noise ratio (CNR) for a conventional read-only optical disc having only an Ag reflective layer on a substrate. The measurements were made when mark depths were 50, 70, and 100 nm, respectively, and RL of a reproducing apparatus was 265 nm.

As is evident from FIG. 1, it is possible to successfully read information recorded in the form of marks (pits) from the optical disc when a mark length is greater than 290 nm since CNR is greater than 40 dB. However, the CNR is sharply decreased for a mark length less than 290 nm. CNR is about 16 dB for a mark length of 265 nm (i.e., RL of the reproducing apparatus), and if a mark length is less than 250 nm, CNR decreases to about zero.

A Super-RENS has received considerable attention as a technology to improve RL of an optical disc reproducing apparatus as defined by Equation (1), and this structure has been applied to phase-change recording optical discs (See "Applied Physics Letters, Vol.73, No.15, October 1998" and "Japanese Journal of Applied Physics, Vol.39, Part I, No.2B, 2000, pp.980–981")

In the Super-RENS, a special mask layer is formed on an optical disc, and surface plasmons generated in the mask layer are used to reproduce information. There are two types of Super-RENS: antimony (Sb) transmission and silver oxide ($AgO_x$) decomposition. In the Sb transmission Super-RENS, an Sb mask layer undergoes a phase change due to a laser beam so it becomes transparent. In the $AgO_x$ decomposition type Super-RENS, an $AgO_x$ mask layer is decomposed into Ag and O by application of a laser beam, and then the Ag generates surface plasmons.

FIG. 2 illustrates the principle of recording on a recordable optical disc using a conventional Super-RENS. As illustrated in FIG. 2, a recording medium has a first dielectric layer 112-1 formed of dielectric material such as $ZnS$—$SiO_2$ or SiN on a transparent polycarbonate layer 111, a mask layer 113 formed of Sb or $AgO_x$, a protective layer 114 made from dielectric material such as $ZnS$—$SiO_2$ or SiN, a recording layer 115 formed of GeSbTe, and a second dielectric layer made of dielectric material such as $ZnS$—$SiO_2$, all of which are sequentially stacked.

Here, the protective layer 114 and the first dielectric layer 112-1 are made from SiN for use with an Sb mask layer 113 while they are made from $ZnS$—$SiO_2$ for use with an $AgO_x$ mask layer 113. The protective layer 114 where near-field interactions occur while reproducing information prevents reactions between the mask layer 113 and the recording layer 115. If the mask layer 113 is made of Sb, the Sb undergoes a phase change upon application of a laser beam so it becomes transparent. If the mask layer 113 is made of $AgO_x$, a laser beam causes $AgO_x$ to be decomposed into Ag and O, and the Ag generates local plasmons.

A laser beam is emitted from a laser 117 having an output power of about 10 to 15 mW, and converged onto the recording medium by a converging lens 118. When a region of the recording layer 115 illuminated by laser is heated to a temperature above about 600° C., the region undergoes a phase change to an amorphous state, and an absorption coefficient of the region decreases. At this time, in a region of the mask layer 113 illuminated by laser, the crystal structure of the Sb changes, or $AgO_x$ is decomposed in a quasi-reversible reaction. Since the region of the mask layer 113 acts as a probe for the recording layer 115, it is possible to successfully reproduce microscopic marks with a size below RL.

However, unlike the recordable recording medium, a read-only recording medium has marks prefabricated on a substrate as well as a different layer stack structure. Furthermore, the read-only recording medium is required to realize the Super-RENS effect only with application of a weak laser beam of 2–3 mW. Thus, for the read-only recording medium, determining material and the type of layer stack structure that can achieve a high CNR becomes a matter of great concern.

SUMMARY OF THE INVENTION

The present invention provides a read-only recording medium designed to achieve a high carrier-to-noise ratio (CNR) using a super-resolution near-field structure (Super-RENS), a method for reading information from the read-only recording medium, and an apparatus for reproducing the same.

According to an aspect of the present invention, there is provided a read-only recording medium on which information has been prerecorded including a substrate having the information recorded on its surface, a reflective layer formed from a phase change material on the substrate, a first dielectric layer formed on the reflective layer; and a mask layer formed from metal oxide on the first dielectric layer.

Here, the presence of the reflective layer formed of the phase material, the first dielectric layer formed on the reflective layer, and the mask layer made from metal oxide causes a Super-RENS operation, thereby allowing marks with a size below an optical resolution limit of a reproducing apparatus to be read with a high CNR. The recording medium further includes a second dielectric layer sandwiched between the substrate and the reflective layer, which also causes the Super-RENS operation. According to the invention, the nanoparticles within the mask layer cause the Super-RENS operation, thereby allowing marks with a size below the optical resolution limit of a reproducing apparatus to be read with a high CNR.

The metal oxide forming the mask layer is noble metal oxide, and the noble metal oxide is one of platinum oxide ($PtO_x$), gold oxide ($AuO_x$), silver oxide ($AgO_x$), and palladium oxide ($PdO_x$). The metal oxide may also be a high melting point metal oxide such as tungsten oxide ($WO_x$). The present invention may cause the Super-RENS operation by appropriately selecting the metal oxide forming the mask layer.

The phase change material forming the reflective layer is one of a compound of silver, indium, antimony, and tellurium (AgInSbTe or AIST) carbon (C), a compound of germanium, antimony, and tellurium (GeSbTe), germanium (Ge), tungsten (W), titanium (Ti), silicon (Si), manganese (Mn), aluminum (Al), bismuth (Bi), nickel (Ni), palladium (Pd), and tellurium (Te). The Super-RENS can be operated by appropriately selecting the phase change material forming the reflective layer.

The information is recorded in the form of marks formed on the surface of the substrate. The thicknesses of the mask layer, the first dielectric layer, and the reflective layer are in the range of 1.5 to 10.0 nm, 10 to 60 nm, 10 to 80 nm, respectively. The present invention allows the Super-RENS to operate by appropriately determining the thicknesses of the mask layer, the first dielectric layer, and the reflective layer. The recording medium may further include a third dielectric layer formed on the mask layer.

According to another aspect of the invention, there is provided a method for optically reading the information recorded on the read-only recording medium described above, wherein the power of a laser beam illuminating the recording medium is in the range of 1.5 to 4.5 mW. Since the reading method allows the power of the laser beam illuminating the recording medium to be appropriately determined, it is possible to read marks with a size below the optical resolution limit of a reproducing apparatus with a high CNR. Furthermore, it is possible to do so regardless of whether the laser beam is emitted from the substrate side or information side of the recording medium.

According to another aspect of the invention, there is provided a reproducing apparatus for optically reading the information recorded on the read-only recording medium, wherein a laser beam illuminating the recording medium has power in the range of 1.5 to 4.5 mW. The reproducing apparatus appropriately uses the Super-RENS of the recording medium to read marks with a size below the optical resolution limit with a high CNR.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other features and advantages of the present invention will become more apparent by describing in detail exemplary embodiments thereof with reference to the attached drawings in which.

DETAILED DESCRIPTION OF THE PREFERRED EMBODIMENTS

Figure 1:
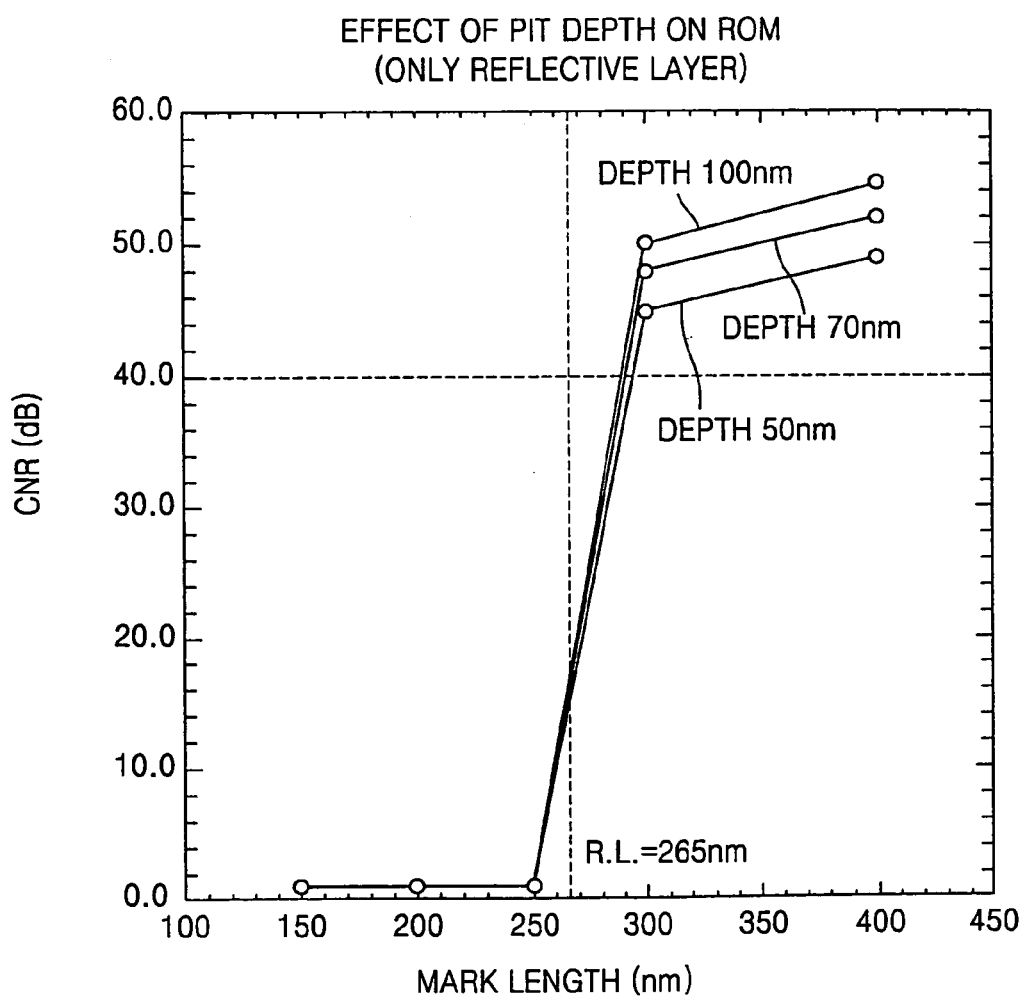
FIG. 1 is a graph illustrating the relationship between a mark length and a carrier-to-noise ratio (CNR) in a conventional read-only recording medium.
Figure 2:
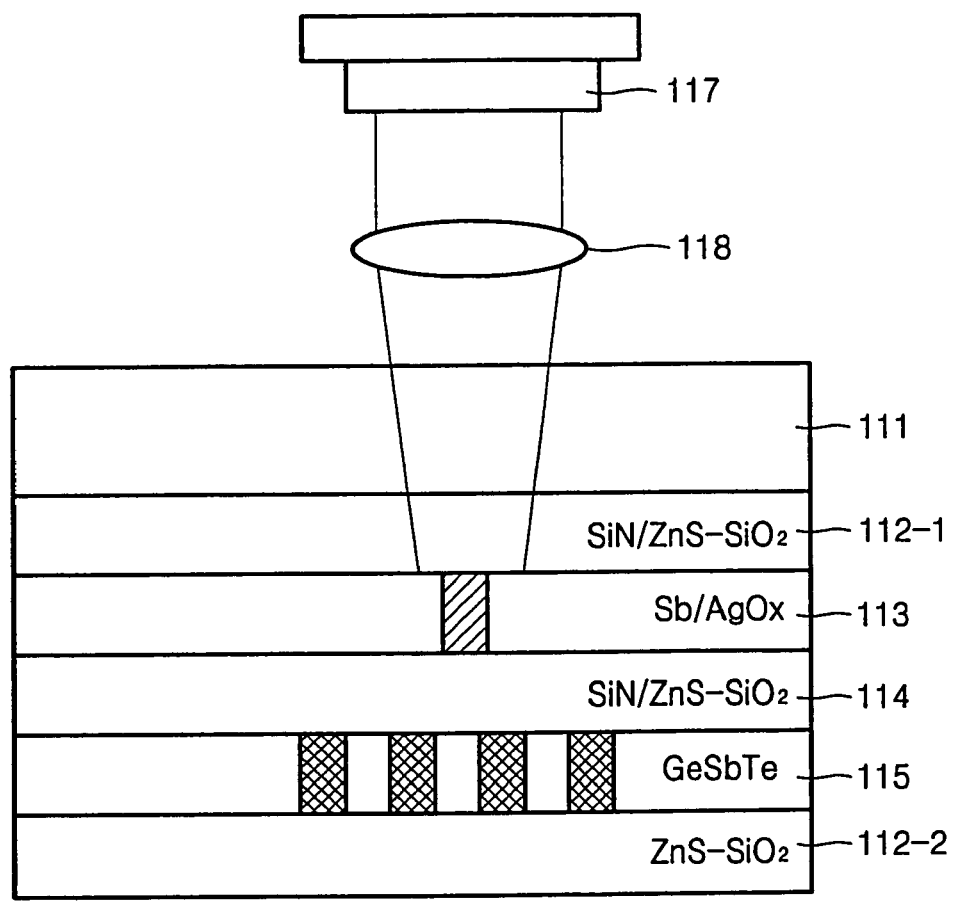
FIG. 2 illustrates the principle of recording on a recordable optical disc using a conventional super-resolution near-field structure (Super-RENS)

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
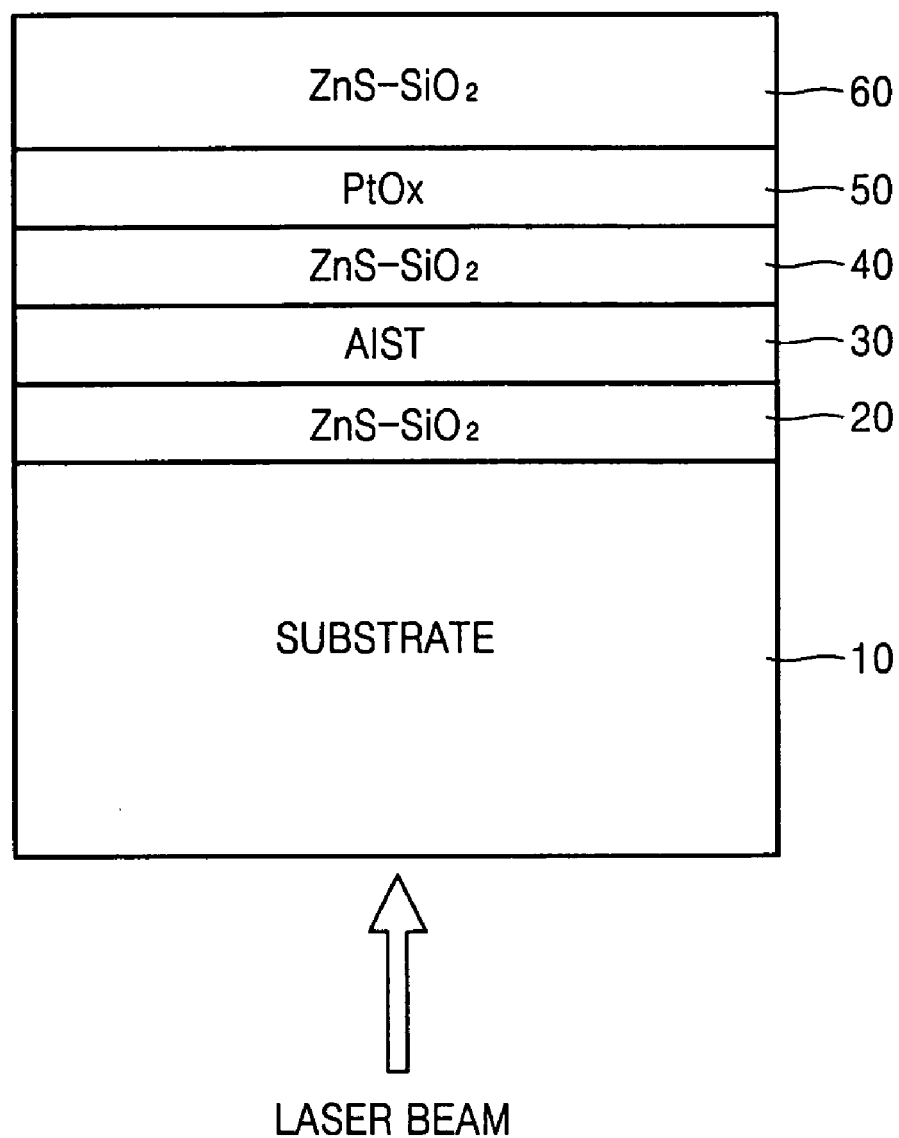
FIG. 3 is a cross-sectional view showing the structure of a read-only recording medium with a Super-RENS according to an embodiment of the present invention.

Referring to FIG. 3, a super-resolution near-field (Super-RENS) ROM has a second dielectric layer 20, a reflective layer 30, a first dielectric layer 40, a mask layer 50, and a third dielectric layer 60 sequentially stacked on a substrate 10. The substrate 10 may be formed from transparent polycarbonate, on which marks or pits (not shown) are formed. In general, information recorded on a Super-RENS ROM is a digital signal represented by the presence or absence of a mark. The mark may be recorded on a groove on the surface of a substrate. The intensity of a beam reflected from the mark varies depending on mark length and depth.

The second dielectric layer 20 is formed on the substrate 10 on which the marks have been formed. The second, first, and third dielectric layers 20, 40, and 60 are made from dielectric material such as ZnS—$SiO_2$. In this embodiment, the thicknesses of the respective dielectric layers 20, 40, and 60 are 0 to 60 nm, 10 to 60 nm, 0 to 200 nm.

The reflective layer 30 is formed from a phase change material having a melting point of 400 to 900° C., such as a compound of silver, indium, antimony, and tellurium (AgInSbTe or AIST) having a melting point of 600° C. The reflective layer 30 may also be formed from high melting point material, such as carbon (C), a compound of germanium, antimony, and tellurium (GeSbTe), germanium (Ge), tungsten (W), titanium (Ti), silicon (Si), manganese (Mn), aluminum (Al), bismuth (Bi), nickel (Ni), palladium (Pd), or tellurium (Te). The thickness of the reflective layer 30 is 10 to 80 nm.

The mask layer 50 is formed from a noble metal oxide such as gold oxide ($AuO_x$), platinum oxide ($PtO_x$), silver oxide ($AgO_x$), or palladium oxide ($PdO_x$), or a high melting point metal oxide such as tungsten oxide ($WO_x$). The mask layer 50 is formed by reactive sputtering. For example, argon (Ar) and oxygen ($O_2$) are fed into a vacuum chamber, and a Pt target is sputtered to form the $PtO_x$ mask layer 50 to a thickness of 1.5–10.0 nm.

The effect of Super-RENS can also be achieved when nanoparticles of noble or high melting point metal are produced in the mask layer 50. For example, the nanoparticles may be produced by forming a mask layer by reactive sputtering as described above and then reducing the mask layer by reactive ion etching (RIE). That is, oxygen in $PtO_x$ forming the mask layer 50 is reduced to produce Pt nanoparticles.

In measurements described below (except for those shown in FIG. 7), as shown in FIG. 3, a laser beam is emitted (from the substrate side) perpendicularly to the substrate 10 in a direction away from the substrate 10 of the Super-RENS ROM toward the third dielectric layer 60. In measurements shown in FIG. 7, the laser beam is emitted (from an information side) perpendicularly to the substrate 10 in the reverse direction to that shown in FIG. 3, i.e., in a direction away from the third dielectric layer 60 toward the substrate 10.

Figure 4:
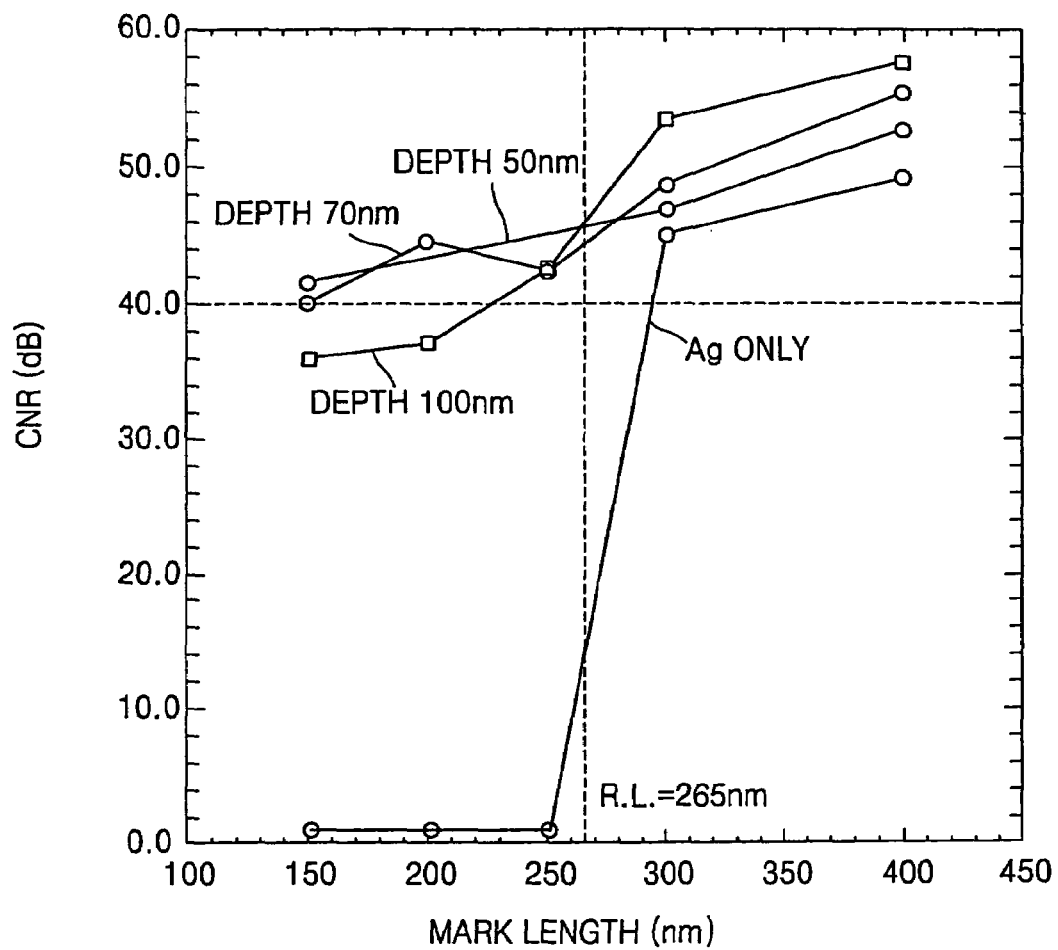
FIG. 4 is a graph illustrating the relationship between a mark length and a CNR in a read-only recording medium according to an embodiment of the present invention.

FIG. 4 is a graph illustrating the relationship between a mark length and a CNR in the Super-RENS ROM of FIG. 3 according to an embodiment of the present invention. Here, the measurements of CNR were made when mark depths are 50, 70, and 100 nm, respectively.

The resolution limit (RL) of an optical system is 265 nm. However, when pit depths are 50 and 70 nm, respectively, a carrier-to-noise ratio (CNR) is 40 dB or more for a mark length of 150 nm, which is sufficiently high to ensure a successful read operation. When a pit depth is 100 nm, a CNR is about 36 dB for the mark length of 150 nm.

For comparison, FIG. 4 also shows the result of CNR measurement for a sample having only an Ag reflective layer without a mask layer. In this case, since a CNR decreases to near zero for a mark length less than 250 nm, it is impossible to read marks.

Figure 5:
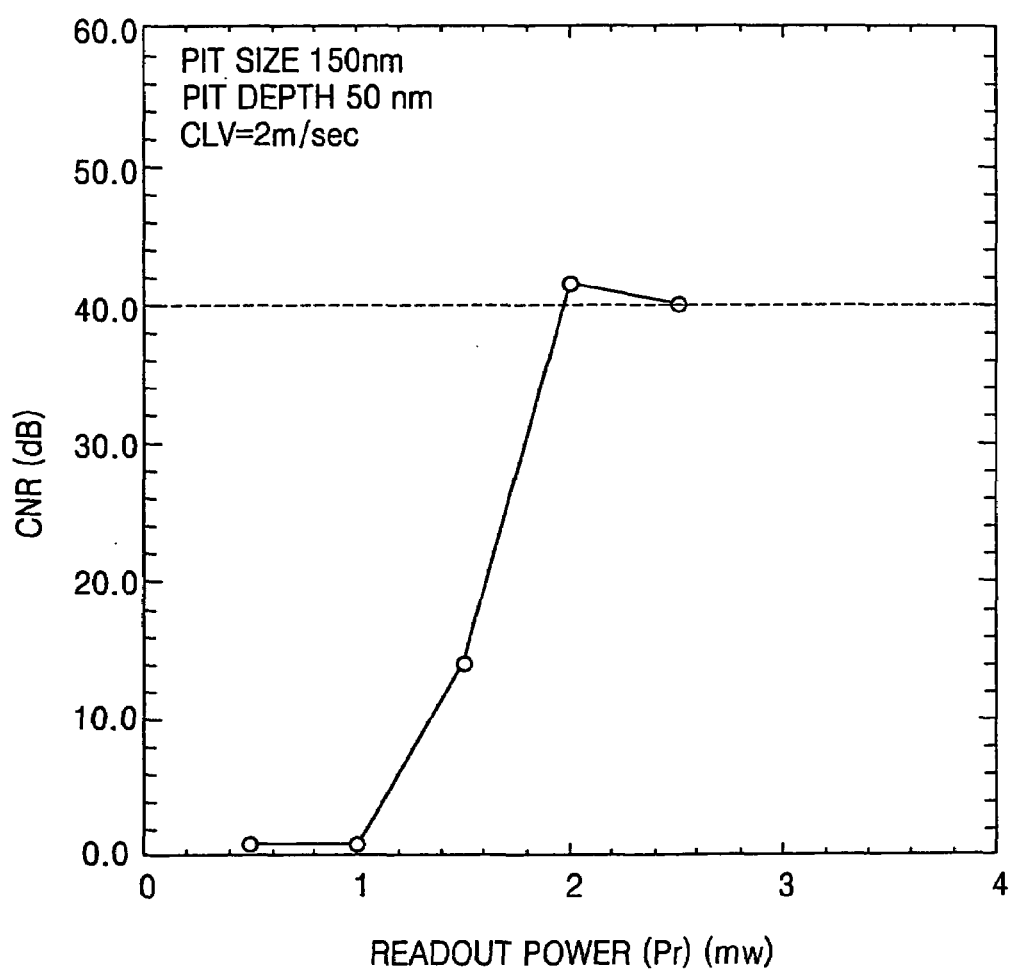
FIG. 5 is a graph illustrating the relationship between readout laser power (Pr) and CNR in a read-only recording medium according to an embodiment of the present invention.

FIG. 5 is a graph illustrating the relationship between readout laser power Pr and a CNR in a Super-RENS ROM according to an embodiment of the present invention where a mark (pit) length is 150 nm, a mark (pit) depth is 50 nm, and constant linear velocity (CLV) is 2 m/sec. As is evident from FIG. 5, while a CNR of the readout signal is near 0 dB at Pr of 1 mW, CNR increases significantly at Pr greater than 1 mW. CNR is 40 dB or more for a Pr in the range of 1.9 to 2.5 mW, which is sufficiently high to ensure successful readout of information recorded on the Super-RENS ROM.

Figure 6:
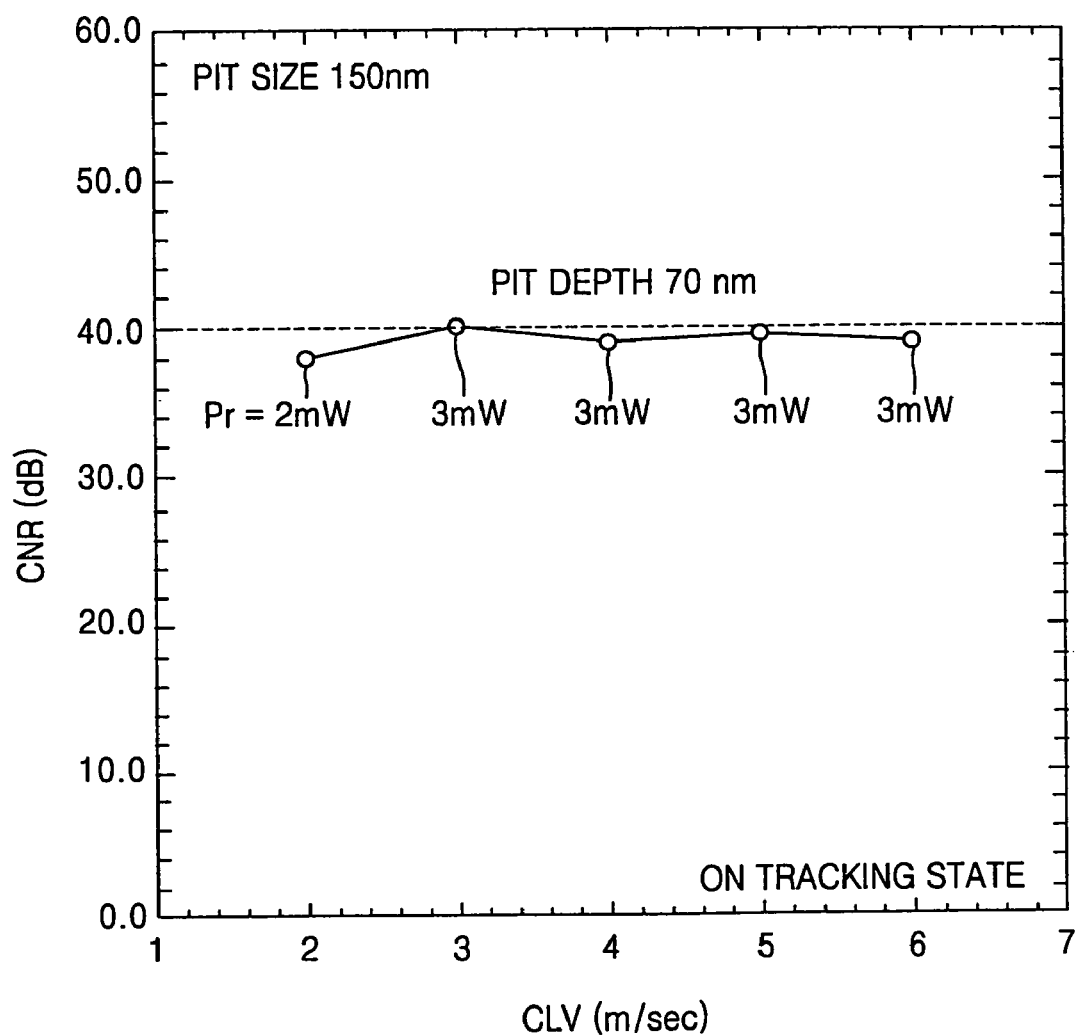
FIG. 6 is a graph illustrating the relationship between constant linear velocity (CLV) and CNR in a read-only recording medium according to an embodiment of the present invention.
Figure 7A:
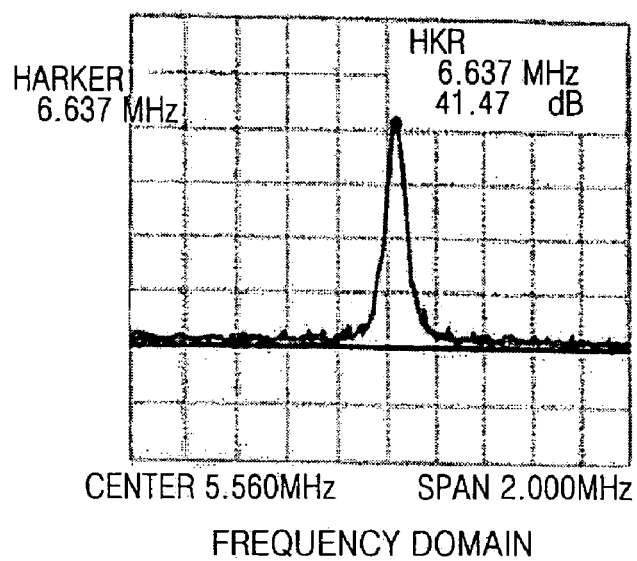
FIGS. 7A and 7B are photographs showing the results of time and frequency domain measurements made for signals read from a Super-RENS ROM disc.
Figure 7A:
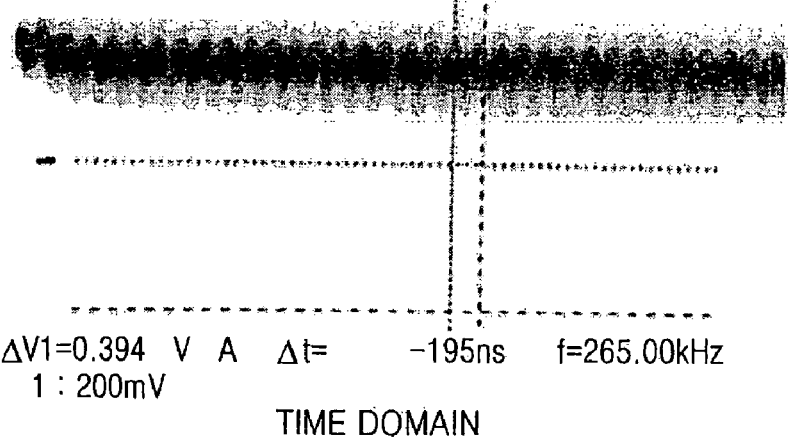
Figure 7B:
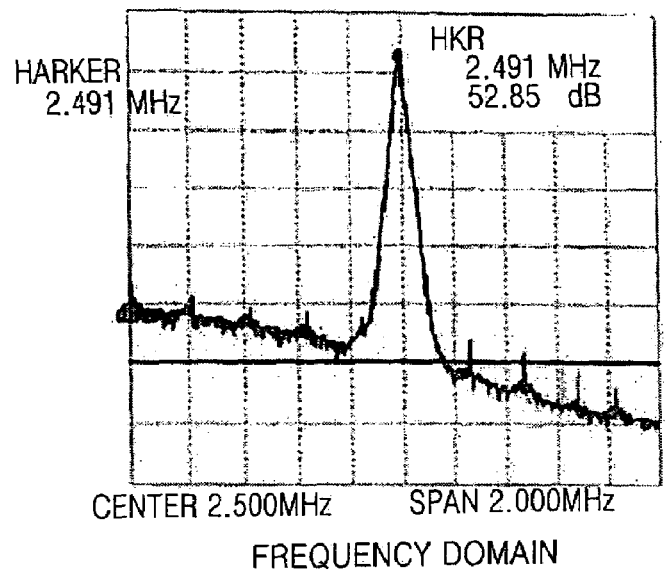
Figure 7B:

FIG. 6 is a graph illustrating the relationship between CLV and CNR in a Super-RENS ROM according to an embodiment of the present invention. Here, measurements of CNR were made when a mark (pit) length is 150 nm and a mark (pit) depth is 70 nm. CNRs of a reflected beam were measured at CLVs in the range of 2 to 6 m/sec when a tracing servo system is activated. The laser beam powers used were 2 mV for CLV of 2 m/sec and 3 mV for other CLVs. The result showed that the CNR was about 40 dB and constant over all CLVs. As is evident from FIG. 6, CNR is about 38 dB for the lower laser beam power at the lowest CLV of 2 m/sec, which is sufficiently high to ensure successful readout of information recorded on the Super-RENS ROM FIGS. 7A and 7B are photographs showing the results of time and frequency domain measurements made for signals read from a Super-RENS ROM disc. These measurements were made under conditions that a pit depth is 50 nm, CLV is 2 m/sec, laser beam power is 2 mW, a laser beam wavelength is 635 nm, and the numerical aperture (NA) of an objective lens is 0.60. In addition, in FIG. 7A, the measurement was made for a mark length of 150 nm at a distance r of 37.1 mm away from the center of the disc. As is evident from the result of frequency domain measurement, CNR was 41.47 dB. In FIG. 7B, the measurement was made for a mark length of 400 nm at a distance r of 51.2 mm away from the center of the disc. The result showed that CNR was 52.85 dB. The results of these measurements demonstrate that a sufficiently high CNR can be achieved with a small mark length of 150 nm.

Figure 8A:
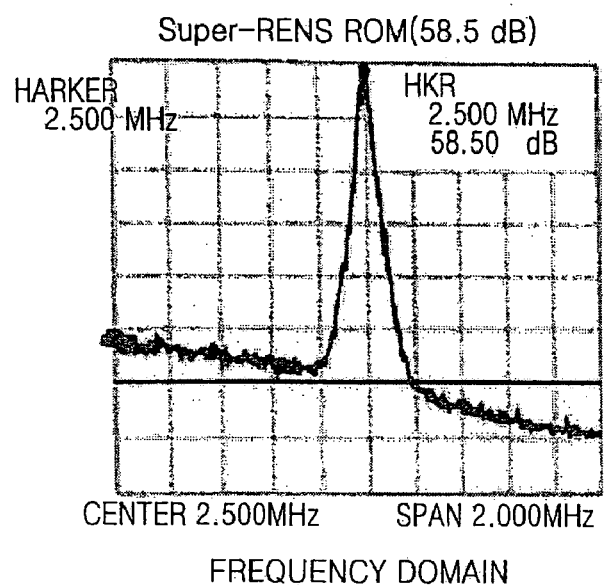
FIGS. 8A and 8B are photographs showing the results of time and frequency domain measurements made for signals read from Super-RENS ROM and conventional ROM discs, respectively.
Figure 8A:
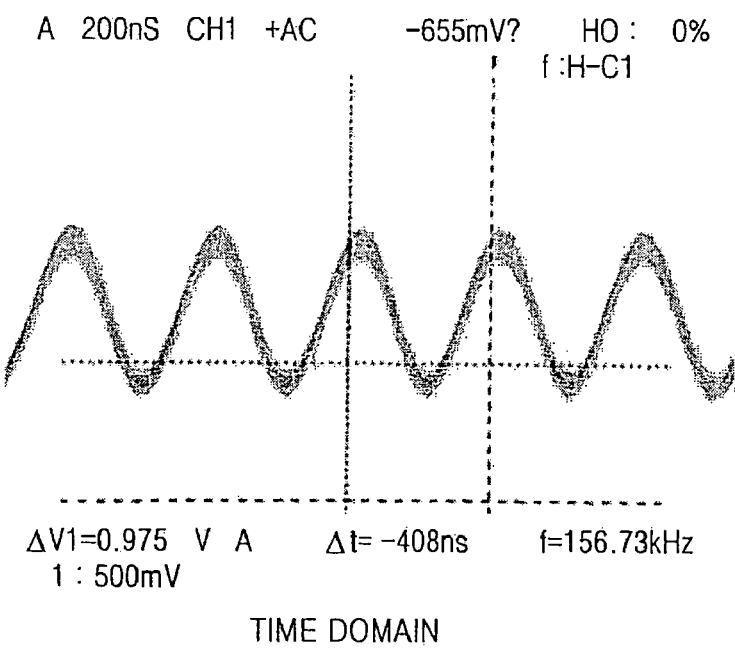
Figure 8B:
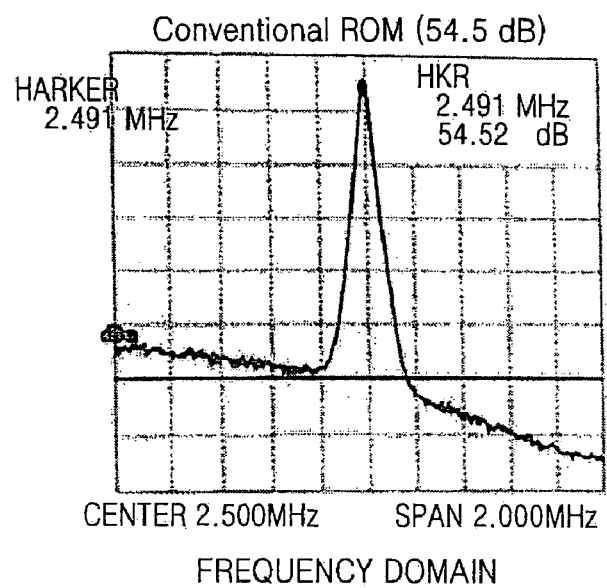
Figure 8B:
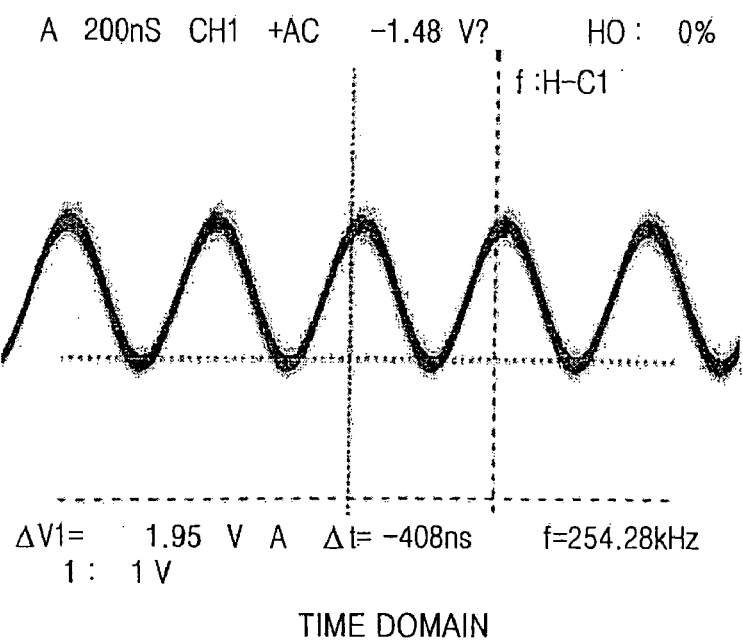

FIGS. 8A and 8B are photographs showing the results of time and frequency domain measurements made for signals read from Super-RENS ROM and conventional ROM discs, respectively. These measurements were made on the assumption that a mark length is 400 nm, a mark depth is 100 nm, CLV is 2 m/sec, laser beam power is 2 mW, a laser beam wavelength is 635 nm, and the numerical aperture (NA) of an objective lens is 0.60. While the result of frequency domain measurement made on the Super-RENS ROM disc in FIG. 8A revealed that CNR was about 58.5 dB, the result of measurement on the conventional ROM disc in FIG. 8B showed that CNR was about 54.5 dB that is about 4 dB lower than that in the Super-RENS ROM disc. Thus, the Super-RENS ROM provides better readout capabilities than the conventional ROM.

Figure 9A:
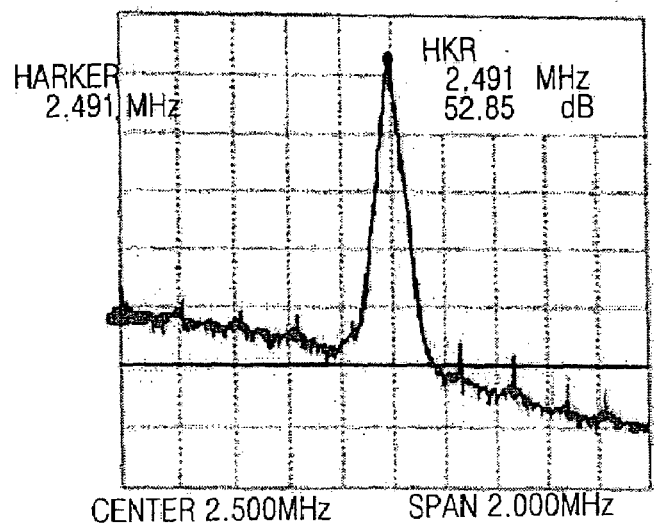
FIGS. 9A and 9B are photographs showing the results of time and frequency domain measurements made for signals read from Super-RENS ROM and conventional ROM discs, respectively.
Figure 9A:
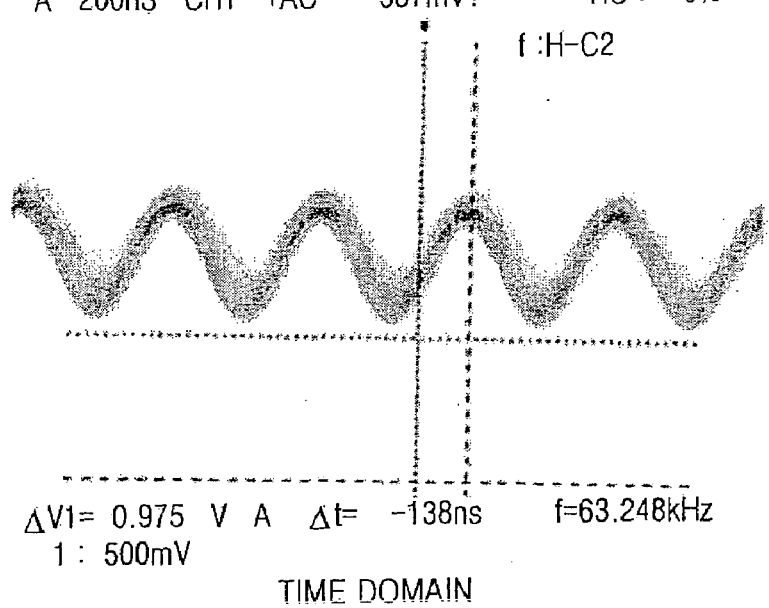
Figure 9B:
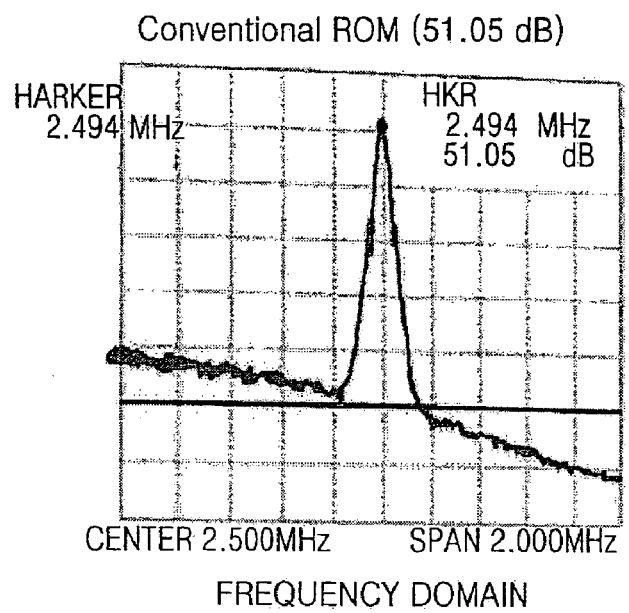
Figure 9B:
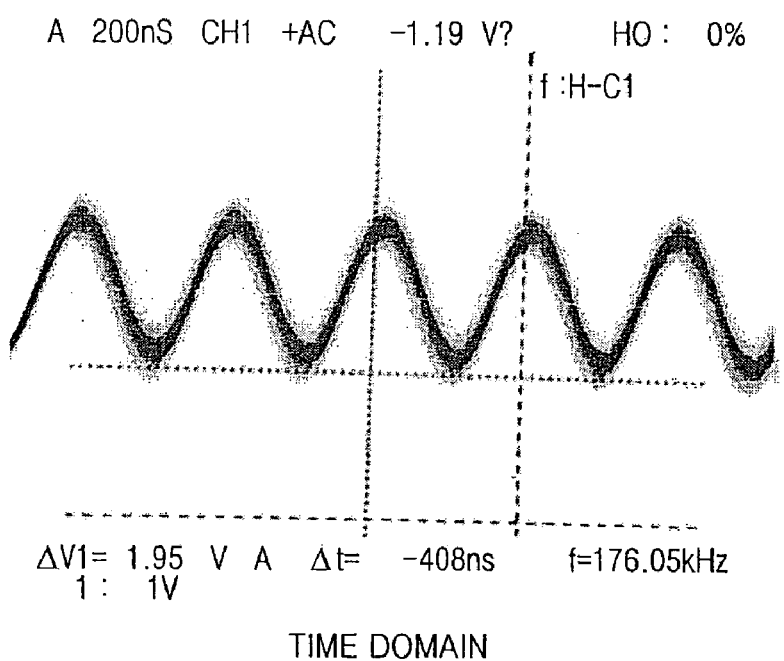

Like FIGS. 8A and 8B, FIGS. 9A and 9B are photographs showing the results of time and frequency domain measurements made for signals read from Super-RENS ROM and conventional ROM discs, respectively. These measurements were made on the assumption that a mark length is 400 nm, a mark depth is 50 nm, CLV is 2 m/sec, laser beam power is 2 mW, a laser beam wavelength is 635 nm, and the numerical aperture (NA) of an objective lens is 0.60. While the result of frequency domain measurement made on the Super-RENS ROM disc in FIG. 9A revealed that CNR was about 52.85 dB, the result of measurement on the conventional ROM disc in FIG. 9B showed that CNR was about 51.05 dB that is about 1.8 dB lower than that in the Super-RENS ROM disc. Thus, the Super-RENS ROM provides better readout capabilities than the conventional ROM.

Furthermore, when Super-RENS ROM is reproduced, diffusion in mask layer and reflective layer was not observed.

Figure 10:
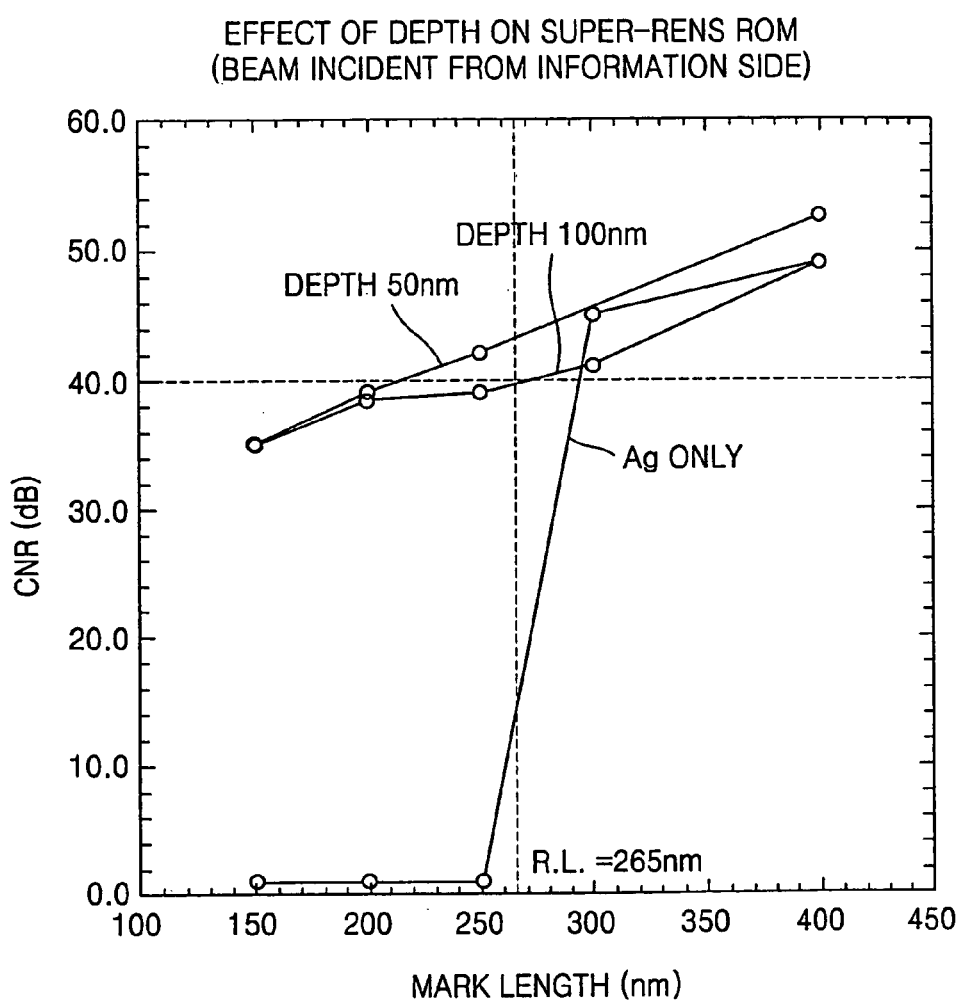
FIG. 10 is a graph illustrating the relationship between a mark length and a CNR when information is read with a laser beam emitted from an information side on a read-only recording medium according to an embodiment of the present invention.

FIG. 10 is a graph illustrating the relationship between a mark length and a CNR when information is read with a laser beam emitted onto the Super-RENS ROM according to an embodiment of the present invention. In this measurement made for mark depths of 50 and 100 nm, as described above, the laser beam is emitted (from an information side) perpendicularly to the substrate 10 in the reverse direction to that shown in FIG. 3, i.e., in the direction away from the third dielectric layer 60 toward the substrate 10.

Here, the RL of an optical system is 265 nm. However, when mark depths are 50 and 100 nm, respectively, a CNR was 35 dB or more for a mark length of 150 nm. Although this is lower than when emitted from the substrate side, it is sufficiently high to ensure a successful read operation. For comparison, FIG. 10 also shows the result of CNR measurement for a sample having only an Ag reflective layer without a mask layer. In this case, since a CNR decreases to near zero for a mark length less than 250 nm, it is impossible to read marks.

In this way, it is possible to read information recorded on the Super-RENS ROM from both substrate and information sides. Thus, the present invention achieves higher density information recording for each Super-RENS ROM by reading information recorded on the Super-RENS ROM having the stack structure of FIG. 3 formed over many times from both substrate and information sides.

The present invention provides a read-only recording medium, on which information has been prerecorded, including a substrate having the information recorded on its surface, a reflective layer formed of a phase change material on the substrate, a first dielectric layer overlying the reflective layer, and a mask layer formed from metal oxide on the first dielectric layer. The presence of the reflective layer, the first dielectric layer, and the mask layer produces a Super-RENS, thereby allowing marks (pits) with a size below optical RL of a reproducing apparatus to be read with a high CNR.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A read-only recording medium on which information has been prerecorded, comprising:
    a substrate having the information recorded on a surface thereof;
    a reflective layer formed of a phase change material on the substrate;
    a first dielectric layer formed on the reflective layer; and
    a mask layer formed of metal oxide on the first dielectric layer.

2. The recording medium of claim 1, further comprising a second dielectric layer interposed between the substrate and the reflective layer.

3. The recording medium of claim 1, wherein the mask layer contains nanoparticles of metal.

4. The recording medium of claim 1, wherein the metal oxide forming the mask layer is a noble metal oxide.

5. The recording medium of claim 4, wherein the noble metal oxide is one selected from the group consisting of platinum oxide ($PtO_x$), gold oxide ($AuO_x$), silver oxide ($AgO_x$), and palladium oxide ($PdO_x$).

6. The recording medium of claim 1, wherein the metal oxide is a metal oxide with a high melting point.

7. The recording medium of claim 6, wherein the metal oxide is tungsten oxide ($WO_x$).

8. The recording medium of claim 1, wherein the phase change material forming the reflective layer is one selected from the group consisting of a compound of silver, indium, antimony, and tellurium (AgInSbTe or AIST); carbon (C); a compound of germanium, antimony, and tellurium (GeSbTe); germanium (Ge); tungsten (W); titanium (Ti); silicon (Si); manganese (Mn); aluminum (Al); bismuth (Bi); nickel (Ni); palladium (Pd); and tellurium (Te).

9. The recording medium of claim 1, wherein the information is recorded in the form of marks formed on the surface of the substrate.

10. The recording medium of claim 1, wherein the thicknesses of the mask layer, the first dielectric layer, and the reflective layer are in the ranges of 1.5 to 10.0 nm, 10 to 60 nm, and 10 to 80 nm, respectively.

11. The recording medium of claim 1, further comprising a third dielectric layer formed on the mask layer.

12. The recording medium of claim 1, wherein the information is read from the substrate surface or from an information surface.

13. The recording medium according to claim 1, wherein the phase change material has a melting point between 400° C. and 900° C.

14. The recording medium according to claim 1, wherein the mask layer is formed by reactive sputtering.

15. The recording medium according to claim 14, wherein the mask layer is reduced by reactive ion etching.

16. A method of optically reading information recorded on the read-only recording medium according to claim 1, wherein the power of a laser beam illuminating the recording medium is in the range of 1.5 to 4.5 mW.

17. The method of claim 16, wherein the recording medium is illuminated from a substrate side by the laser beam.

18. The method of claim 16, wherein the recording medium is illuminated from an information side by the laser beam.

19. A reproducing apparatus for optically reading information in combination with the read-only recording medium according to claim 1, wherein the power of a laser beam illuminating the recording medium is in the range of 1.5 to 4.5 mW.

* * * * *

UNITED STATES PATENT AND TRADEMARK OFFICE
CERTIFICATE OF CORRECTION

PATENT NO.         : 7,166,346 B2
APPLICATION NO. : 10/813619
DATED              : January 23, 2007
INVENTOR(S)        : Joo-ho Kim et al.

It is certified that error appears in the above-identified patent and that said Letters Patent is hereby corrected as shown below:

Title page, Item (75) Inventors, change "Junil Tominaga, Ibaraki-ken (KR)" to --Junil Tominaga, Ibaraki-ken (JP) --

Signed and Sealed this

Third Day of April, 2007

JON W. DUDAS
*Director of the United States Patent and Trademark Office*